United States Patent [19]

Yamazaki et al.

[11] Patent Number: 5,058,360
[45] Date of Patent: Oct. 22, 1991

[54] FILLING AND SEALING APPARATUS FOR FLUID CONTAINING PACKAGE

[75] Inventors: Yasuo Yamazaki, Kanagawa; Toshiaki Nomura; Takashi Maruyama, both of Tokyo; Shigenobu Sato, Kanagawa, all of Japan

[73] Assignee: Toppan Printing Co., Ltd., Tokyo, Japan

[21] Appl. No.: 586,759

[22] Filed: Sep. 24, 1990

[30] Foreign Application Priority Data

Apr. 4, 1990 [JP] Japan .................................. 2-89983
Apr. 13, 1990 [JP] Japan .................................. 2-39970
Jul. 31, 1990 [JP] Japan .................................. 2-203388

[51] Int. Cl.⁵ ............................................. B65B 61/00
[52] U.S. Cl. .................................... 53/133.2; 53/563;
53/373.7; 53/374.8; 53/DIG. 2
[58] Field of Search ................. 53/128, 133, 373, 287,
53/410, 412, 416, 478, 563, DIG. 2, 133.2,
128.1, 373.7, 373.8, 374.8; 156/69, 498; 493/87,
213

[56] References Cited

U.S. PATENT DOCUMENTS

| | | | |
|---|---|---|---|
| 3,660,965 | 5/1972 | Morera | 53/373 X |
| 4,055,032 | 10/1977 | Hammond | 53/410 |
| 4,246,062 | 1/1981 | Christine | 53/410 X |
| 4,288,967 | 9/1981 | Seko et al. | 53/373 X |
| 4,568,321 | 2/1986 | Gaubert | 493/213 |
| 4,709,528 | 12/1987 | Merkus | 53/128 |
| 4,788,811 | 12/1988 | Kawajiri et al. | 53/410 X |
| 4,894,975 | 1/1990 | Ausnit | 53/412 |
| 4,902,269 | 2/1990 | Susini et al. | 493/213 X |
| 4,909,434 | 3/1990 | Jones et al. | 493/87 X |
| 4,924,655 | 5/1990 | Posey | 53/128 |

Primary Examiner—John Sipos
Attorney, Agent, or Firm—Hidaka and Benman

[57] ABSTRACT

A filling and sealing apparatus has a temporary spout attaching device for temporarily attaching a spout onto a wall of a package having one end open and the other end closed, a spout fusing device for fusing the temporarily attached spout to the package, a filling device for filling the package with fluid through the open end thereof and a package sealing device for sealing the open end of the package filled with liquid. The spout fusing device includes an anvil adapted to be inserted into the package having the temporarily attached spout, a ultrasonic fusing device arranged in facing relation to the anvil and a temperature regulation device for supplying temperature regulation fluid through the anvil. The anvil may be formed with a groove in one of side surfaces thereof for receiving the temporarily mounted spout. The spout fusing device has a ultrasonic vibration horn. The ultrasonic horn has a top end portion formed with a recess for receiving a pouring portion of the spout protruding outwardly from the package and vibrating at ultrasonic frequency. An elastic member is provided in the recess of the ultrasonic vibration horn and partially in contact with an inner peripheral surface of the recess, so that the spout is pressedly held by the elastic member.

8 Claims, 12 Drawing Sheets

FILLING AND SEALING APPARATUS FOR FLUID CONTAINING PACKAGE

BACKGROUND OF THE INVENTION

1. Field of the Invention

The present invention relates to a filling and sealing apparatus for filling a package having one end open and the other end closed with fluid through the open end and then sealing the latter.

2. Prior Art

Such a filling and sealing apparatus usually comprises a spout attaching device, a spout fusing device, a filling device and a sealing device.

Figures 18, 19:
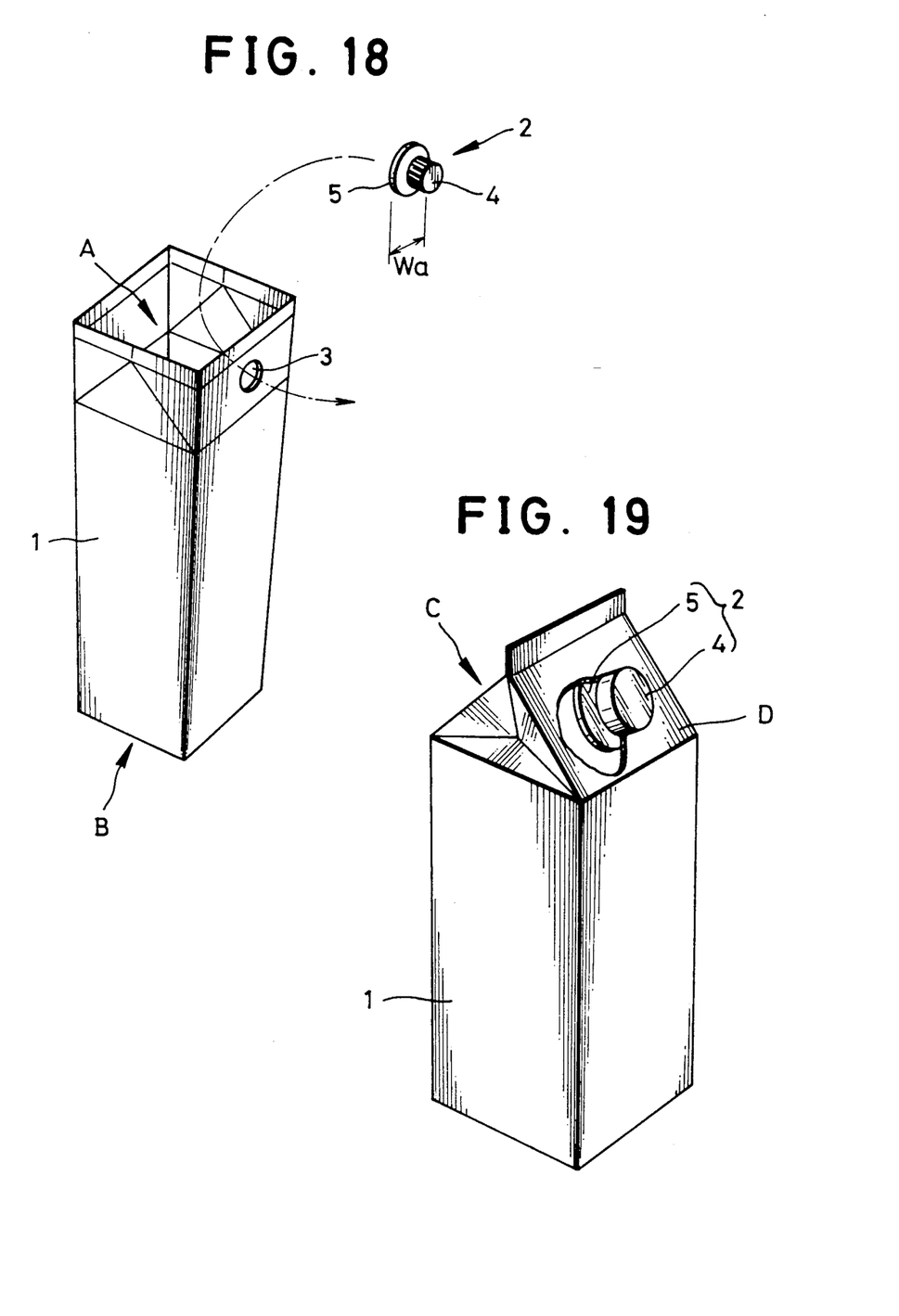
FIG. 18 is a perspective view showing one example of the package and the spout.
FIG. 19 is a perspective view of the package filled with content as a product.

The spout attaching device functions to temporarily attach a spout 2 on a flap of an open end portion A of a package 1 having the other end B closed, as shown in FIG. 18. In the flap of the package 1, a hole 3 is preliminarily provided for temporary attachment of the spout 2. The package 1 is formed from the so-called paper lamination material which is formed by laminating on both surfaces of a paper sheet synthetic resin films of for example, polyethylene. The spout 2 is a mold of synthetic resin such as polyethylene and has a pouring portion 4 and a flat flange 5.

The spout fusing device functions to fuse the spout 2 attached temporarily on the package 1 and adhere it to the latter. The filling device functions to fill the package 1 with drink material such as liquor or fruit juice through the open end A thereof. The sealing device functions to seal the open end A of the package 1 filled with such liquid.

Upon completion of the sealing operation of the sealing device, the package filled with liquid becomes a product, as shown in FIG. 19. The package is usually in the form of cylinder having square or rectangular cross section and the open end portion A is defined by an upper flap portion C including a pair of opposing flaps and another pair of opposing flaps which are orthogonal to the first flap pair. The flaps of the first opposing flap pair are folded to allow edge portions of the flaps of the other pair to be adhered to each other. The spout 2 is secured to one (D) of the flaps thus adhered together. Liquid filling the package 1 is poured through the spout 2.

U.S. Pat. No. 4,788,811 discloses a spout fusing device of ultrasonic type for fusing a temporarily attached spout 2 to a package. The ultrasonic fusing device is used to heat a flange 5 of the spout 2 and a portion of the package 1 which is in contact therewith, by applying ultrasonic vibration thereto to thereby fuse them together.

When this method is used, an anvil 6 is inserted into the package 1 so that the flange portion 5 of the spout 2 is held stably and a vibration horn 7 of the ultrasonic fusing device is abutted externally to the spout 2. By applying ultrasonic vibration through the ultrasonic vibration horn to the flange 5 and the package flap, the latter two are heated and fused together, as shown in FIG. 20.

When this fusing is used, however, temperature of the anvil 6 may be increased by repeated fusing operations, causing fusing conditions of the spout 2 to be changed with temperature change of the anvil 6. As a result, there is a strong possibility of unsatisfactory fusing of the spout 2. For example, when the anvil temperature becomes very high, the package 1 may be fused to the anvil 6, so that the package 1 can not be pulled out easily from the anvil 6 after the fusing operation or it can be broken if pulled out.

When atmospheric temperature of a place in which the fusing operation is being performed is too low, temperature of the anvil 6 is also too low. Therefore, an output of the ultrasonic fusing device regulated preliminarily to a desired temperature may become insufficient to heat the spout 2 to the desired temperature, as a result of which the fusing of the spout 2 becomes incomplete.

Figure 20:
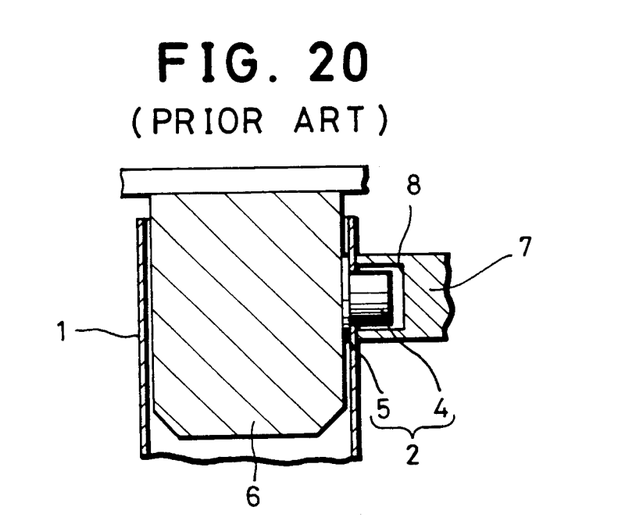
FIG. 20 is a cross section showing fusing operation of the spout to the package using a conventional ultrasonic vibration horn.

Since the pouring portion 4 of the spout 2 temporarily attached to the package 1 protrudes outwardly of the package 1, as shown in FIG. 20, the horn 7 has to have a recess 8 for receiving the protruded pouring portion with annular gap therebetween when the horn 7 is positioned to the shown place to apply ultrasonic vibration to the flange 5 of the spout 2. With the annular space provided between the recess 8 and the spout 2, the pouring portion 4 of the latter may be vibrated excessively in direction perpendicular to its axis when ultrasonic vibration is applied through the horn 7 thereto, resulting in pin holes in the spout 2.

Figure 21:
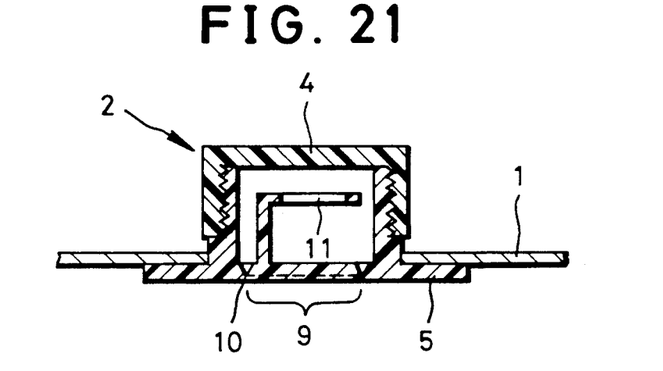
FIG. 21 is a cross section showing another example of the spout.

In an example of the spout 2, there is a shield portion 9 provided integrally with the flange 5, as shown in FIG. 21. The shield portion 9 functions to prevent the liquid in the container 1 from being exposed to atmosphere and is bounded with respect to the flange 5 by an annular thin portion defined by an annular groove 10. In order to remove the shield portion 9 when the package is to be used, a pull-up ring 11 is integrally formed on the shield portion 9. That is, when it is desired to pour the liquid out from the package 1, a cap of the pouring portion 4 is removed from the flange 5 and then the pull-up ring 11 is pulled up by a finger to break the annular groove 10 to thereby separate the shield, portion 9 from the flange 5, resulting in an opening.

In such spout 2 as having the groove 10 formed in the flange, 5, when the pouring portion 4 is vibrated excessively, there may formed pin holes in, particularly, the groove portion or even there is a possibility of local breakage of the groove portion.

Figure 22:
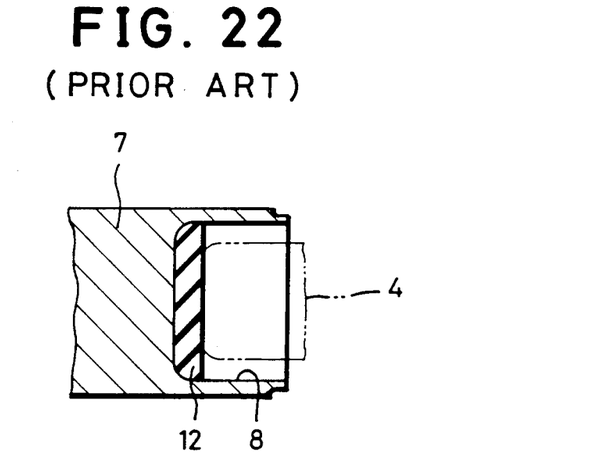
FIG. 22 is a cross section showing a portion of a conventional ultrasonic vibration horn of another type.

In order to prevent an excessive vibration of the pouring portion 4, an elastic member 12 of such as rubber is provided on a bottom of the recess 8 of the horn 7 causes to so that the pouring portion 4 is urged by the elastic member 12 to absorb excessive vibration, as shown in FIG. 22.

In such conventional device, however, since the elastic member 12 is made in intimate contact with the bottom of the recess 8, vibration of them due to ultrasonic vibration transmitted thereto by the horn 7 causes to generate frictional heat therebetween which causes an abnormally large load to be applied to the ultrasonic oscillation source driving the horn 7. Therefore, it becomes difficult to reliably perform the fusing operation of the spouts to the packages for a long period of time.

As mentioned above, in the conventional spout fusing device, there are problems of temperature change of the anvil 6, abnormal heat generation of the ultrasonic horn 7 and impossibility of reliable fusing of the spout to the package.

SUMMARY OF THE INVENTION

An object of the present invention is to provide a filling and sealing apparatus in which a spout fusing operation for fusing a spout to a package can be reliably performed for a long period of time.

In order to achieve the object, a filling and sealing apparatus according to the present invention comprises temporary spout attaching means for attaching temporarily a spout to a flap of a package having one end open and the other end closed, spout fusing means for fusing a temporarily attached spout to the package, filling means for filling the package with fluid through the open end of the package and sealing means for sealing the open end of the package filled with the content, wherein the spout fusing means comprises an anvil adapted to be inserted into the package to, which the spout is attached temporarily, ultrasonic fusing means arranged in an opposing relation to the anvil and temperature regulating means for forcibly flowing temperature regulating fluid through the anvil. The spout is secured to the package by urging the spout temporarily attached to the package to the anvil and heating it by the ultrasonic fusing means while regulating temperature of the anvil by the temperature regulating means.

This filling and sealing apparatus achieves the above mentioned object by maintaining anvil temperature within a predetermined range during the spout fusing operation is performed.

According to another embodiment of the present invention, the filling and sealing apparatus comprises temporary spout attaching means for temporarily attaching a spout to a flap of a package having one end open and the other end closed, spout fusing means for fusing a temporarily attached spout to the package, filling means for filling the package with liquid through the open end of the package and sealing means for sealing the open end of the package filled with the content, wherein the spout fusing means comprises an anvil adapted to be inserted into the package to which the spout is attached temporarily, ultrasonic vibration horn arranged in an opposing relation to the anvil and having a recess provided in a front end portion thereof for receiving a protruded portion of the spout and an elastic member provided in the recess of the ultrasonic vibration horn. The elastic member and the recess of the ultrasonic vibration horn are in contact with each other not completely but partially. The filling and sealing apparatus achieves the above object by preventing vibration of the spout itself during a spout fusing operation by means of the elastic member, preventing abnormal heat generation of the vibration horn even when the elastic member is provided in the vibration horn to thereby preventing application of abnormally large load on an oscillation source for driving the ultrasonic vibration horn at an ultrasonic frequency.

DETAILED DESCRIPTION OF THE PREFERRED EMBODIMENTS

Figure 1:
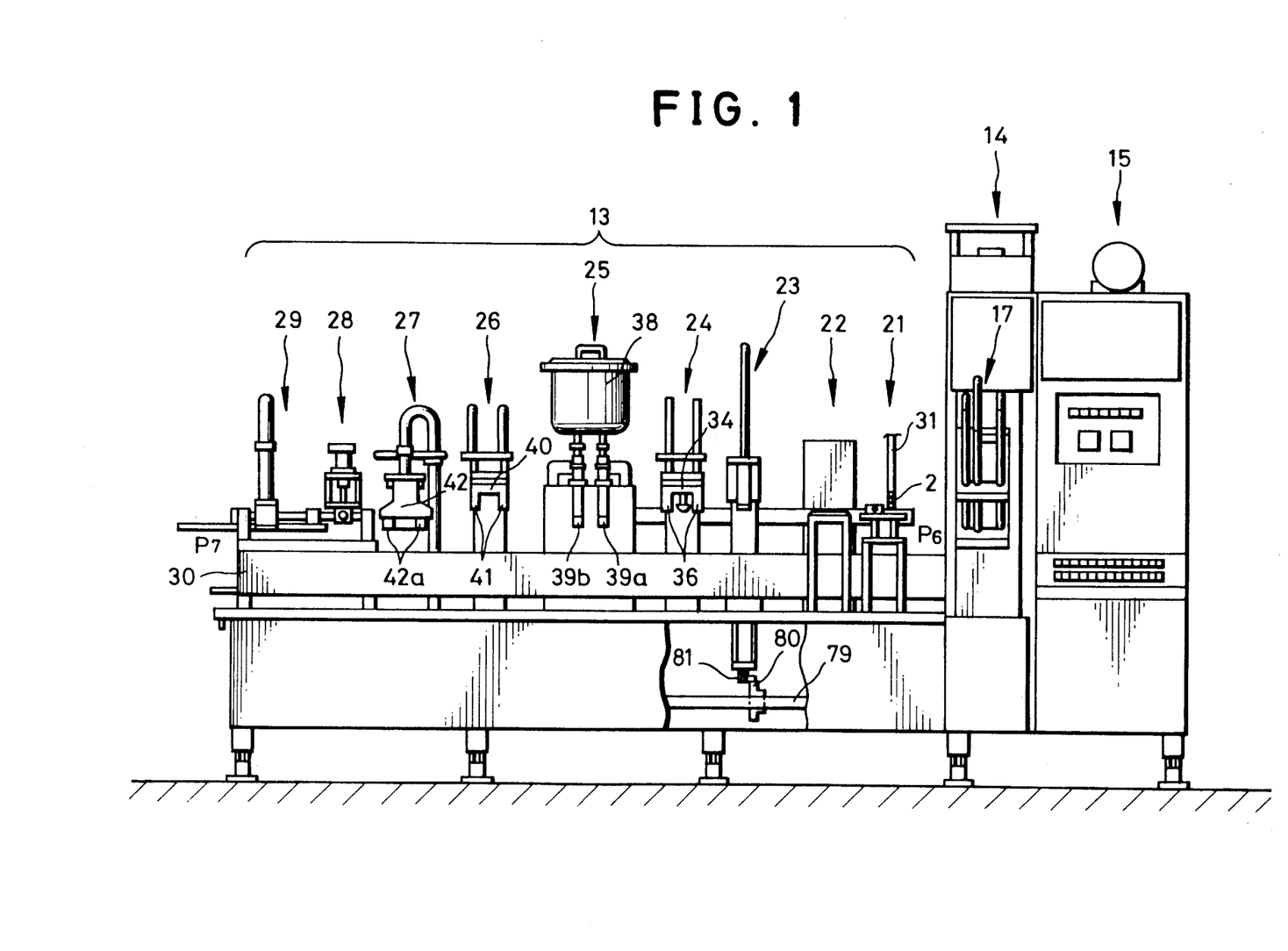
FIG. 1 is a front view of an embodiment of a filling and sealing apparatus according to the present invention.

FIG. 1 shows a filling and sealing apparatus according to the present invention as a whole. The filling and sealing apparatus comprises, generally, a packaging portion 13, a package shaping and supplying portion 14 and a operation control portion 15.

Figure 2:
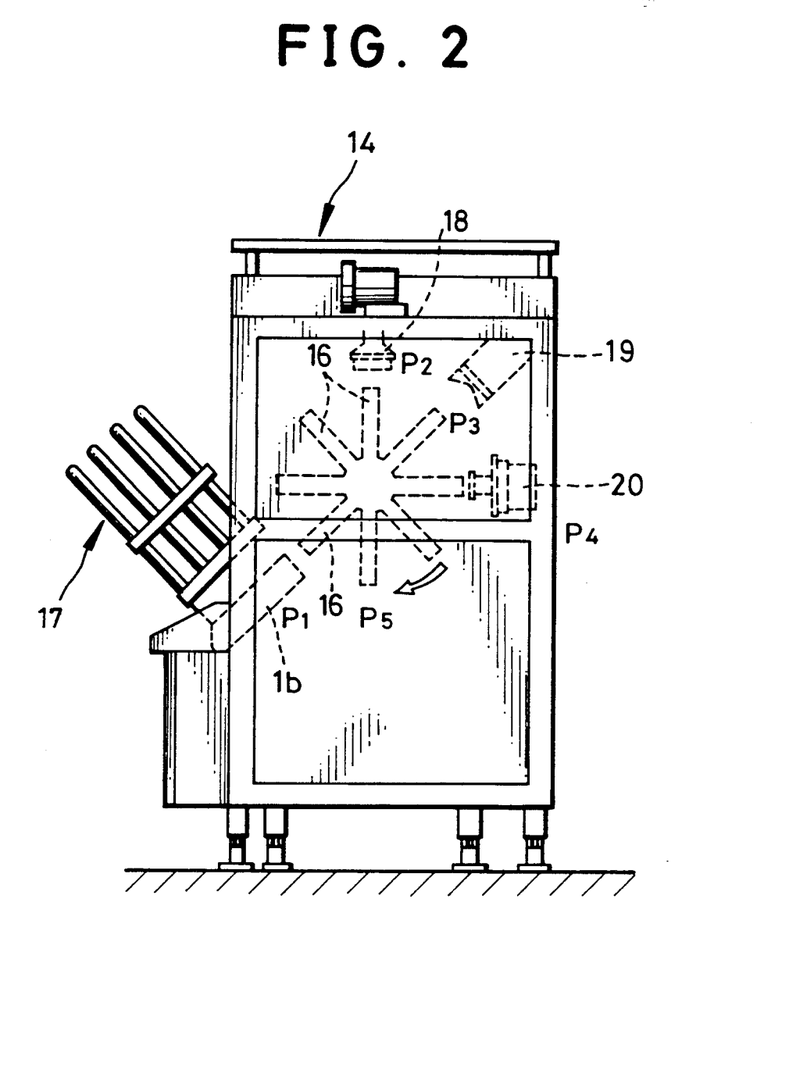
FIG. 2 is a side view of a package shaping and supplying portion which is one of the devices constituting the filling and sealing apparatus shown in FIG. 1, as viewed from the right-hand side of FIG. 1.

The package shaping and supplying portion 14 includes eight mandrels 16 arranged radially and equiangularly as shown in FIG. 2. Each mandrel 16 takes in the form of cylinder having square or rectangular cross section. The mandrels 16 are rotated intermittently in clockwise direction. That is, each mandrel is stopped for a predetermined time at a package proper receiving position P1, a bottom heating position P2, a bottom folding position P3, a bottom sealing position P4 and a package supply position P5, sequentially, in the order.

Figure 23:
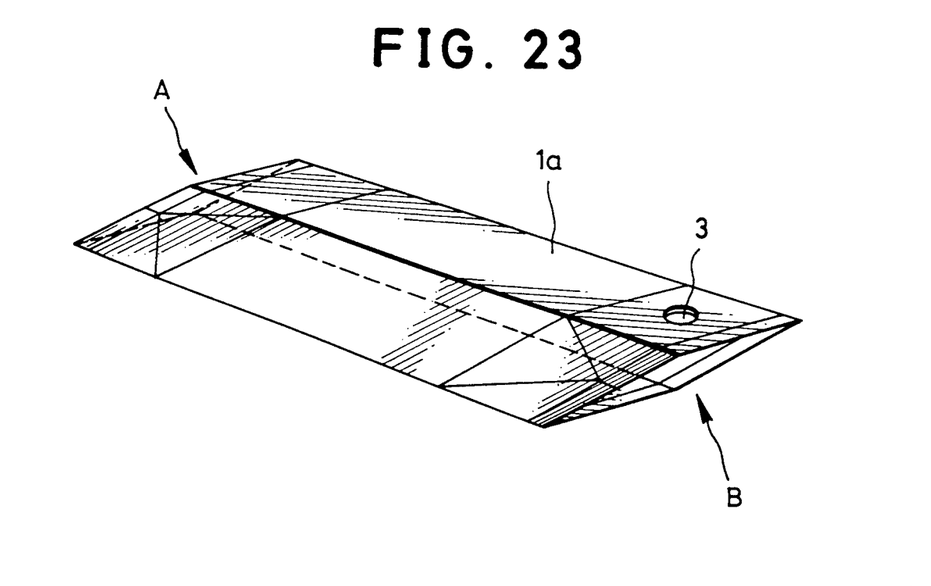
FIG. 23 is a perspective view showing a package folded down to a stock sheet state.

A package proper feeder 17 is disposed in the package proper receiving position P1. In the package proper feeder 17, a plurality of package propers 1a in folded down stock state are stacked as shown in FIG. 23. A heater 18 is provided in the bottom heating position P2, a folding device operable in synchronism with rotation of the mandrels 16 is arranged in the bottom folding position P3 and a bottom press device 20 is arranged in the bottom sealing position P4.

In FIG. 1, the packaging portion 13 includes a package conveyor belt 30 extending from the package shaping and supplying portion 14 leftwardly as viewed on the drawing sheet. The package conveyor belt 30 is reciprocal, intermittently, between a package receiving position P6 (FIG. 3) corresponding to the package supply position P5 (FIG. 2) in the package shaping and supplying portion 14 and a package discharge position P7 at which a package product filled with liquid and sealed is discharged.

Along the reciprocal path of the package conveyor belt 30 from the package receiving position P6 to the package discharge position P7, that is, the package transportation path, a temporary spout attaching device 21, a spout fusing device 22, a cleaning device 23, a first top breaker device 24, a filling device 25, a second top breaker device 26, a top heater device 27, a package sealing device 28 and a package discharge device 29 are arranged in the sequence.

The filling and sealing apparatus constituted as mentioned above is controlled in operation by a control device (not shown) included in the operation control portion 5. The operation will be described with reference to FIG. 3.

Figure 24:
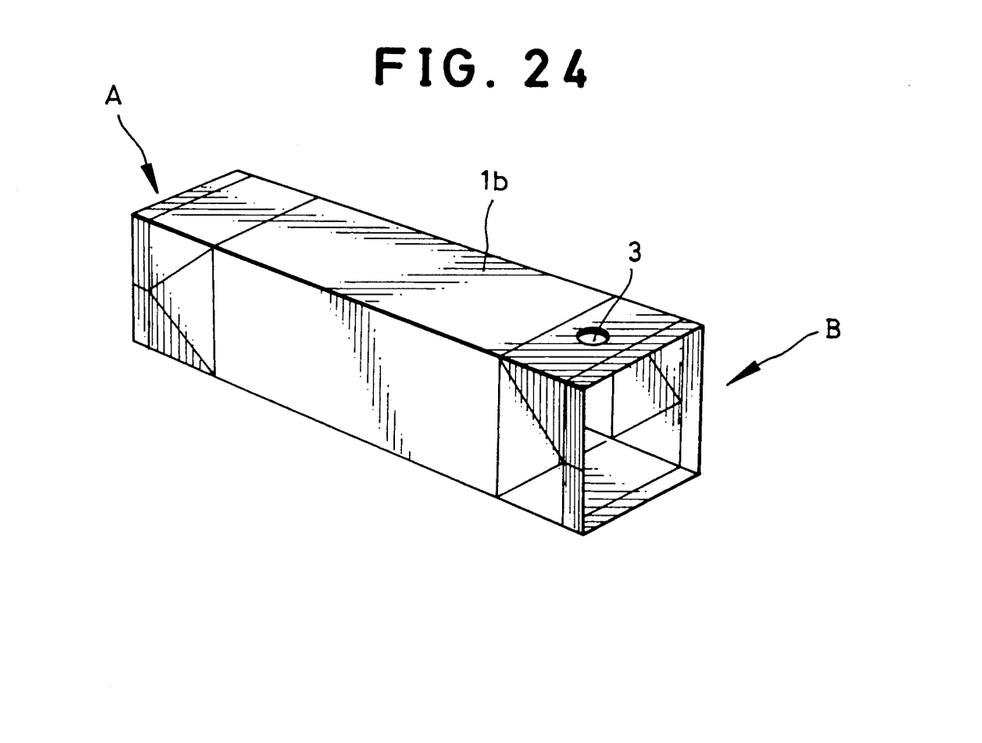
FIG. 24 is a perspective view of the package shaped to a four-cornered cylinder.

The stack of the package propers 1a in the folded state (FIG. 23) in the package proper feeder 17 has been described with reference to FIG. 2. The lowest one of these package propers 1a in the stack is derived and transported to the package proper receiving position P1. During this transportation, the package proper 1a in the folded state (FIG. 23) is shaped to a cylindrical form 1b as shown in FIG. 24, with both end portions A and B of the cylindrical package proper 1b being kept open.

In FIG. 2, the package proper 1b set in the package proper receiving position P1 is fitted on one of the mandrels 16 which is stationary in that position at that time. When the mandrel 16 on which the package proper 1b is fitted is rotated clockwise and reaches the bottom heating position P2, an upper open end of the package proper 1b is heated by the heater 18. Since the package proper 1b is made from a lamination of a paper and plastic sheets sandwitching the paper as mentioned previously, a portion heated by the heater 18 becomes viscose.

The package proper 1b having the viscose, upper open end is transported to the bottom folding position P3 and, in the position P3, it is temporarily folded inwardly along preliminarily provided foldable lines by the folding device 19. The package proper 1b having its end folded temporarily is then transported to the bottom sealing position P4 in which the temporarily folded, viscose upper end thereof is pressed and sealed by the bottom press device 20. Thus, a package 1 having the end A open and the other end B sealedly closed is obtained as shown in FIG. 18.

The package 1 formed in this way is then transported to the package supply position P5 in which it is pulled away from the mandrel 16 and is received by the package conveyor belt 30 (FIG. 1) in the package receiving position P6. Thereafter, the package 1 is intermittently transported by the package conveyor belt 30 leftwardly on the drawing sheet (FIG. 1 or 3) and stopped firstly at a position corresponding to the temporary spout attaching device 21. The temporary spout attaching device 21 includes a spout dispenser (not shown) containing a number of spouts 2 (FIG. 18) and a spout feeding shute 31 through which the spouts 2 in the spout dispenser is fed one by one to the package transportation path. The spout 2 thus supplied is inserted into a hole 3 formed preliminarily in the flap of the upper portion of the package 1 so that it is fitted on an inside of the hole 3 temporarily. The package 1 having the spout temporarily fitted thereon is transported to a position facing to the spout fusing device 22 and stopped thereat.

Figure 3:
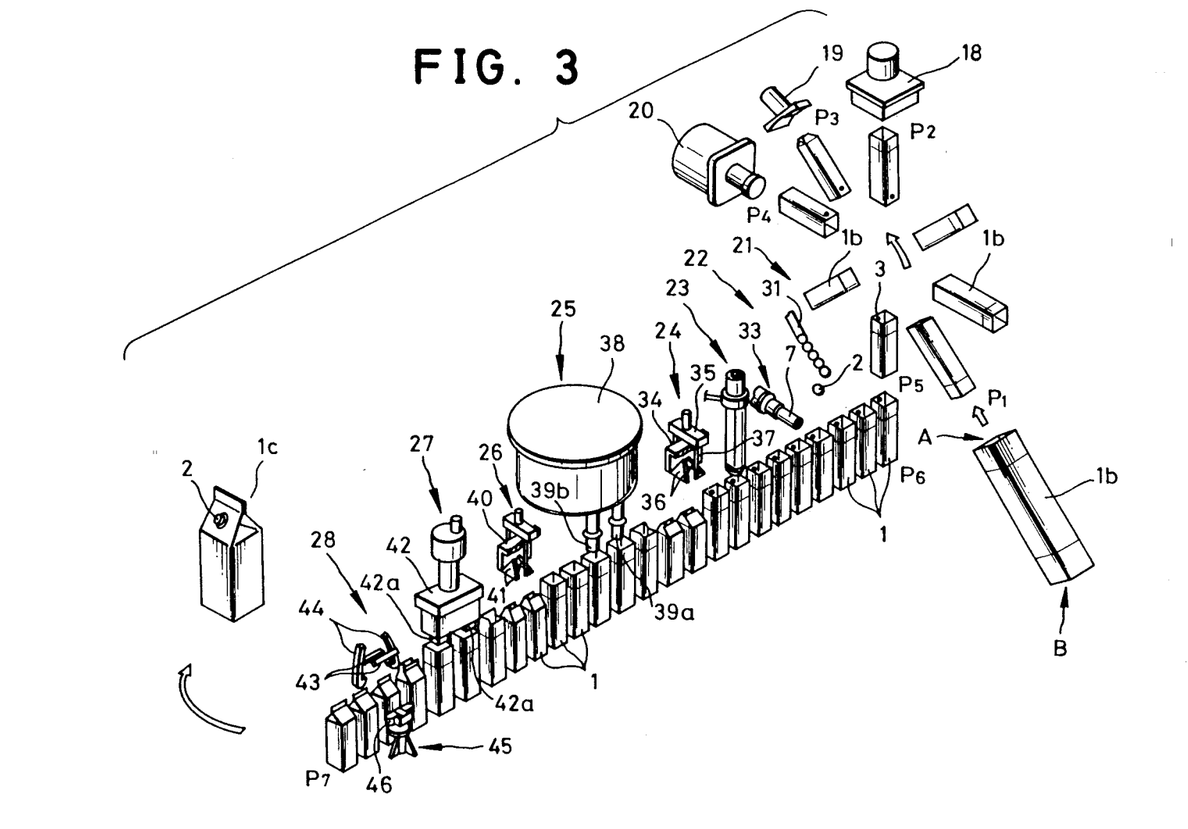
FIG. 3 is a perspective view illustrating a package shaping process and a packaging process which are to be performed by the filling and sealing apparatus.

The spout fusing device 22 includes a ultrasonic fusing device 33 having a ultrasonic vibration horn 7 as shown in FIG. 3. The spout 2 temporarily fitted on the package 1 is pushed to the inner surface of the flap of the container 1 by the ultrasonic horn 7 and is subjected, together with the flap, to ultrasonic vibration transmitted by the horn 7. With such ultrasonic vibration, the spout 2 and the inner surface of the flap of the package 1 in contact therewith are heated and melted to form a fused contact therebetween.

The package 1 having the spout 2 fused thereto is transported to and stopped at a position facing to the cleaning device 23 in which the interior of the package 1 is subjected to a cleaning process. Then, the package 1 is transported to a position facing to the first top breaker device 24.

The first top breaker device 24 includes a frame 34 and a clock 35 connected to the frame 34 and driven in a vertical directions by a suitable drive means. A pair of folding members 36 are mounted on a lower end of the frame 34. The folding members each having triangle shape are swingable to fold, inwardly, flaps of the upper portion of the package 1 adjacent to the portion thereof on which the spout 2 is fused. The folding members 36 are ganged with the block 35 through a suitable link 37. When the package 1 is transported to the position facing to the first top breaker device 24, the frame 35 and the block 36 thereof are lowered together. At this time, the folding members 36 are inwardly swung by an action of the link 37 to temporarily fold the flaps of the package 1 along foldable lines (provided on the package preliminarily) to thereby form a roof shape. The package 1 is then transported to a position facing to the filling device 25 while the upper portion of the package 1 is gradually recovering from the roof shape by its own elasticity.

The filling device 25 includes a reservoir 38 for storing liquid such as liquor or fruit juice to fill the package 1 and filling nozzles 39a and 39b extending from the reservoir 38. The filling nozzles 39a and 39b are adapted to supply the content of the reservoir 38 to a pair of packages 1 simultaneously when these packages come into positions immediately below these nozzles respectively. With this simultaneous supply of liquid to two of the packages through the nozzles 39a and 39b, it becomes possible to fill these packages with a predetermined amount of liquid even within short stay in their positions. For example, it may be possible to fill the package 1 completely by filling half through the filling nozzle 39a positioned at an upstream position on the package transportation path and then filling it with the other half by the nozzle 39b positioned in a down stream.

The package 1 filled with liquid is transported to a position facing to the second top breaker device 26 in which the upper open portion of the package 1 is again folded inwardly along the temporarily folded lines by a pair of folding members 41 mounted on a frame 40 thereof. Thereafter, the package 1 is transported up to a position facing to the top heater device 27.

The top heater device 27 includes a block 42 provided with a pair of heater portions 42a. When the upper open portion of the package 1 stopped in facing relation to the heater portions 42a, the resin layers of the open end portion of the package 1 are heated thereby to close them together. Then, the package 1 is transported to a position facing to the package sealing device 28.

The package sealing device 28 includes a pair of blocks 43 for pressing the upper end of the package 1 and a pair of nail members 44 for bending, inwardly, the side surfaces of the upper portion of the package 1 adjacent to the side portion thereof on which the spout 2 is mounted. When the package sealing device 28 is lowered down onto the package 1, the nail members 44 bend the upper side portions of the package 1 and, simultaneously, the blocks 43 press the upper end portions of the package 1 to firmly adhere them together sealingly.

The package sealing device 28 further includes an evacuation device 45 for discharging air from the package 1. The evacuation device 45 includes a pair of press arms 46 which are arranged on opposite sides of the package transportation path and rotatable in synchronism with the package transportation. The side portions of the upper portion of the package 1 are pressed inwardly by these press arms 46 to raise the liquid level in the package to thereby minimize the air volume therein.

The package 1 having the upper portion sealed by the package sealing device 28 is transported by the package discharge device 29 (FIG. 1) externally as a product package 1c.

The overall construction and operation of the filling and sealing apparatus are thus described. Now, the filling and sealing apparatus, particularly, respective devices constituting the packaging portion 13 will be described in detail.

Spout Fusing Device 22

Figures 4, 5:
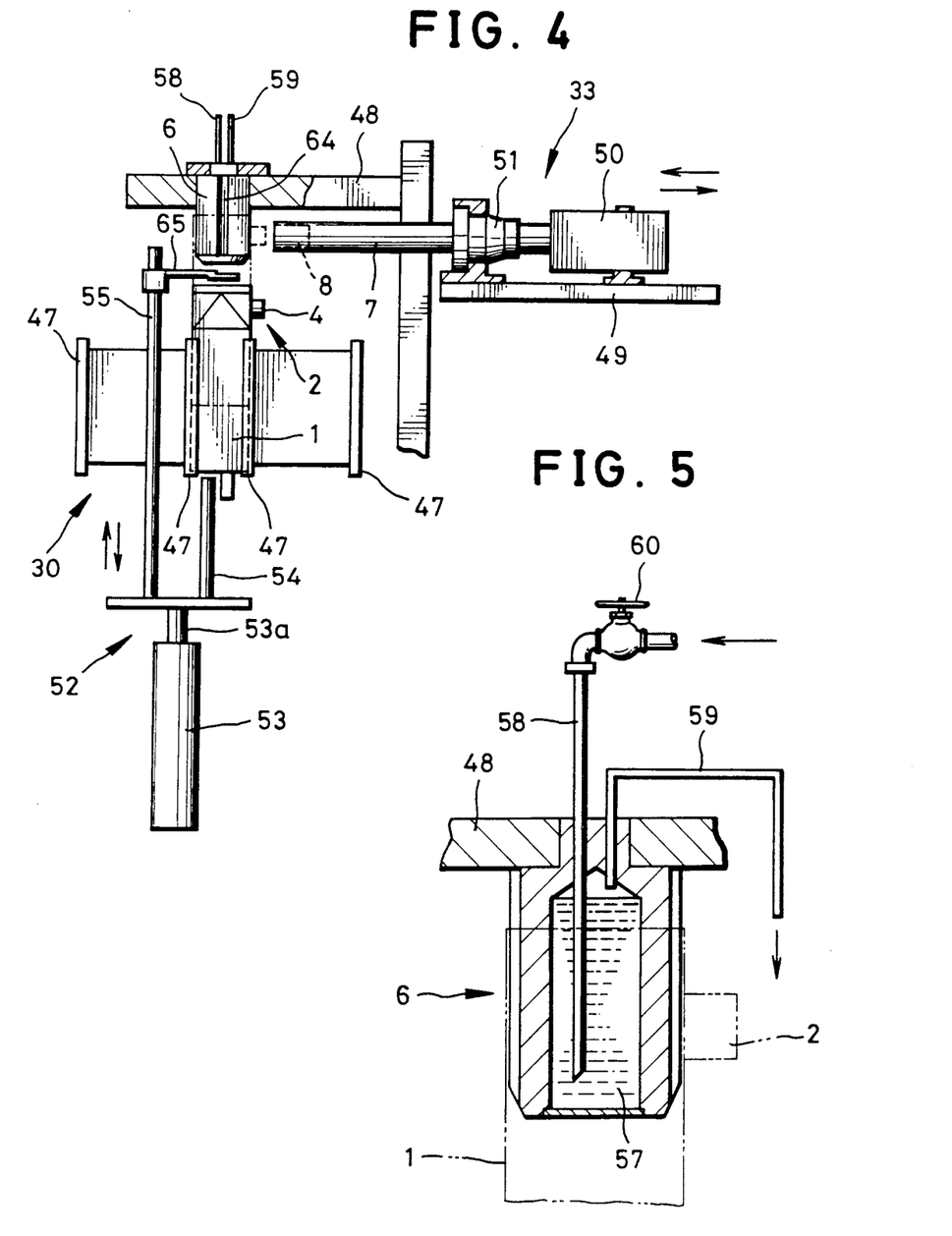
FIG. 4 is a side view of a spout fusing device which is another of the devices constituting the filling and sealing apparatus.
FIG. 5 is a cross section showing an anvil used in the spout fusing device.

FIG. 4 is a side view of the spout fusing device 22 in FIG. 1 when looked in rightward direction on the drawing sheet.

In FIG. 4, the package 1 is transported vertically by the package conveyor belt 30 having nails 47. The anvil 6 supported by a frame 48 is fixedly disposed above the package conveyor belt 30. The anvil 6 is of, for example, stainless steel and has a corresponding shape to that of the interior of the package 1. The ultrasonic fusing device 33 is provided on the right side of the anvil 6. The ultrasonic fusing device 33 includes a converter 50 fixedly secured onto a slide table 49, a booster 51 fixedly secured to the slide table 49 and the vibration horn 7 fixedly secured to the left side of the slide table 49. The slide table 49 is reciprocatively driven in a horizontal direction by a drive device which is not shown.

A package elevator, device 52 is arranged beneath the package conveyor belt 30 in a position facing to the anvil 6. The package elevator device 52 is composed of an air cylinder 53, a push-up rod 54 mounted on an actuator rod 53a of the air cylinder 53 and a push-down rod 55 mounted on the same.

In FIG. 4, the, temporary mounting of the spout 2 (see FIG. 18) on the upper flap portion of the package 1 transported by the package conveyor belt 30 is described. When such package is moved beneath the anvil 6, the transportation of the package 1 is stopped temporarily. Thereafter, the air cylinder 53 is actuated to lift up the push-up rod 54 to thereby lift up the package 1.

The upper open end (A in FIG. 18) of the package 1 thus lifted up is fitted on the anvil 6, as shown by a chain line.

With the package 1 fitted on the anvil 6, the slide table 49 is moved leftwardly (as viewed in FIG. 4) and a top end (left side end) of the vibration horn 7 contacts with a right side upper surface of the package 1 and presses it to the anvil 6, as shown in FIG. 20. In this case, the pouring portion 4 (see FIG. 18) of the spout 2 is received in the recess 8 formed in the vibration horn 7. Under these conditions, the flange 5 of the spout 2 and the inner surface of the package 1 contacting with the latter are heated by ultrasonic vibration, as a result of which the spout flange 5 is fused to the inner wall of the package 1.

Upon a completion of the fusing, the slide table is moved rightwardly to detach the horn 7 from the package 1. Then, the air cylinder 53 is actuated to lower the push-down rod 55 to thereby remove the package 1 from the anvil 6. Thereafter, the package 1 is transported by the package conveyor belt 30 to the subsequent stage, that is, the cleaning stage to be performed by the cleaning device 23 (FIG. 1).

With repetition of the spout fusing process, there may be abnormal temperature increase of not only the spout 2 but also the anvil 6 due to ultrasonic vibration transmitted thereto through the vibration horn 7. When temperature of the anvil 6 is increased beyond a certain acceptable limit, there may be a case where the package 1 can not be removed easily from the anvil 6 or the package 1 is damaged due to fusion of the inner surface of the package, 1 thereto.

In order to prevent the anvil 6 from being heated too much, temperature regulation means for restricting temperature of the anvil 6 is provided in the latter as shown in FIG. 5. The temperature regulation means shown in FIG. 5 is composed of a cavity 57 formed in the anvil 6, a fluid supply pipe 58 extending into a deep portion of the cavity 57 and a fluid discharge pipe 59 extending into a shallow portion of the cavity 57.

The fluid supply pipe 58 is connected to a fluid supply source which is not shown through a cock 60 so that temperature regulating fluid such as cold water is supplied from the fluid supply source to the anvil cavity 57 through the fluid supply pipe 58. The fluid discharge pipe 59 is connected to fluid recovery means (not shown) such as a waste fluid tank to which cold water in the cavity 57 is returned therethrough. In FIG. 4, while the spout fusing operation is repeated by the ultrasonic fusing device 33, cold water is supplied through the fluid supply pipe 58 into the cavity 57 and discharged therefrom through the fluid discharge pipe 59. As a result, heat generated in the anvil 6 is removed by the coolant, so that the anvil 6 is kept at a temperature within a predetermined range. Therefore, the undesired fusion of the inner wall of the package 1 to the anvil 6 is prevented.

On the other hand, when the spout fusing device 33 is subjected to a very low temperature in such as winter season, there may be a case where the anvil temperature becomes too low and so it is difficult for the ultrasonic fusing device 33 to increase spout temperature to a temperature high enough to fuse the spout 2 to the package 1 which leads to incomplete fusion of the spout 2 to the package 1. In such case, it is possible to use, instead of cold water in FIG. 5, hot water. That is, hot water is supplied through the fluid supply pipe 58 into the cavity 57 and discharged through the discharge pipe 59 therefrom. Thus, the anvil 6 is prevented from being cooled down to a temperature lower than an acceptable lower limit.

The temperature regulation means can take any other constructions than as shown in FIG. 5 so long that it can keep the anvil temperature within a predetermined range.

As fluid for temperature regulation, other medium such as air can be used instead of hot water or cold water.

Figures 6, 7:
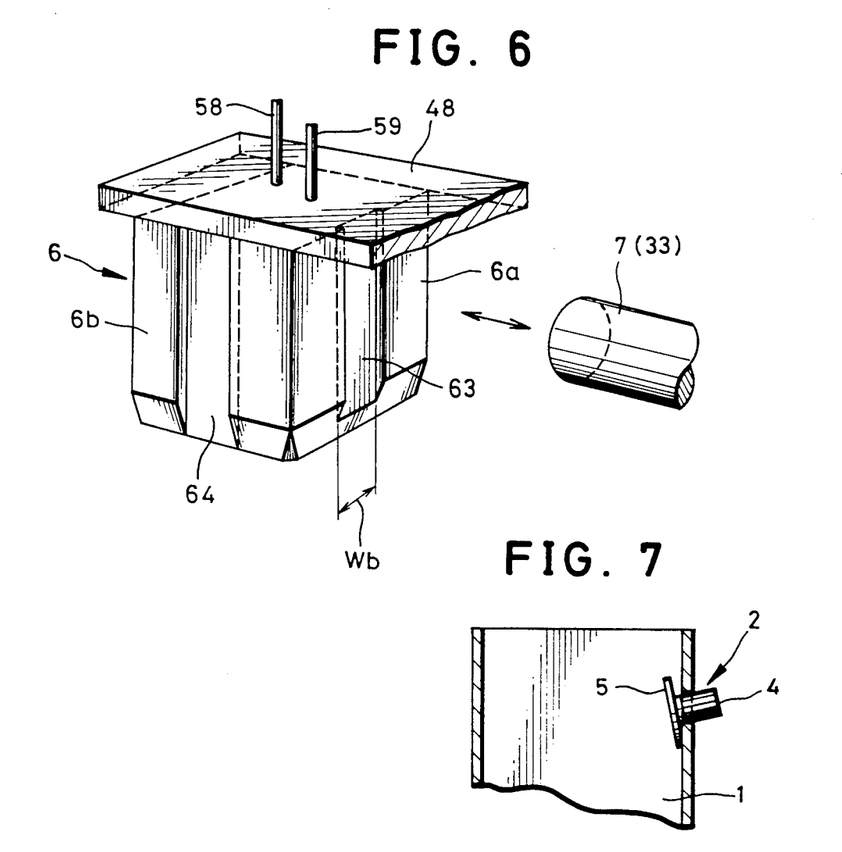
FIG. 6 is a perspective view of the anvil.
FIG. 7 is a cross section showing an example of temporary attachment of the spout to the package.

As shown in FIG. 6, a groove 63 having width Wb slightly wider than a width Wa (FIG. 18) of the flange 5 of the spout 2 and extending longitudinally of the direction of insertion of the package is formed in a side surface 6a of the anvil 6 which faces to the vibration horn 7 of the ultrasonic fusing device 33. The reason for the formation of such groove as denoted by 63 in the anvil 6 is as follows.

An attitude of the spout 2 temporarily mounted on the package 1 is not always normal and there may be a case where it is temporarily mounted on the package in a tilted state as shown in FIG. 7. In such case, there may be a case where, when the package 1 is being fitted on the anvil 6, the flange 5 of the spout 2 collides with the side surface a of the anvil 6, leading to unsuitable fitting. In order to prevent this, the groove 63 is provided. That is, when the package 1 is being fitted on the anvil 6, the inwardly protruding portion of the flange 5 is received by the groove 63 and thus a relative movement of the package 1 to the anvil 6 is smoothened, so that the misalignment of the spout 2 with respect to the package 1 is reliably prevented.

Another groove 64 formed in another side surface 6b of the anvil 6 provides a relief space for the nails 65 fixedly secured to the push-down rod 55 shown in FIG. 4.

The recess 8 formed in the ultrasonic horn 7 of the ultrasonic fusing device 33 shown in FIG. 4 is constructed as described below.

Figure 8:
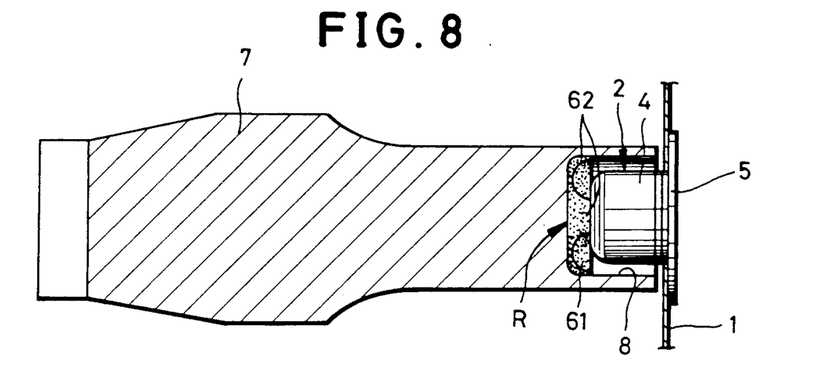
FIG. 8 is a cross section showing an example of mounting of an elastic member on a ultrasonic vibration horn used in the spout fusing device.
Figure 9:
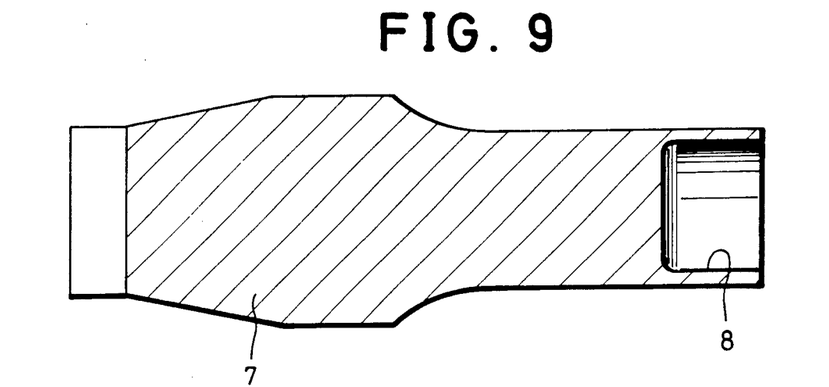
FIG. 9 is a cross section of an example of the ultrasonic vibration horn.

As shown in FIG. 8, a resilient member 61 is provided in the recess 8 (see FIG. 9) of the vibration horn 7. The resilient member 61 functions to press the spout cap 4 when the spout flange 5 is fused to the inner wall of the package 1 by the top end of the vibration horn 7 to thereby prevent the spout 2 from being vibrated thereby. Formation of any pin hole in the flange 5 during the fusing can be prevented by the prevention of vibration of the spout 2.

Figure 10:
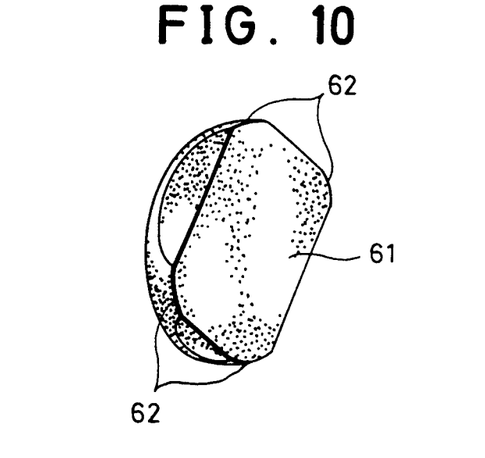
FIG. 10 is a perspective view showing the elastic member itself.

The resilient member 61 has a substantial square cross section as shown in FIG. 10 and each of four corner portions 62 is rounded so that it corresponds to an inner surface configuration of the recess 8. When the resilient member 61 is fitted in the recess 8, it is in contact with the inner surface of the recess 8 at the corner portions 62 and a rear surface R thereof. That is, the resilient member 61 is in contact with the inner surface of the recess 8 not completely with the whole surface thereof but partially with the corner portions 62, etc.

Figure 11:
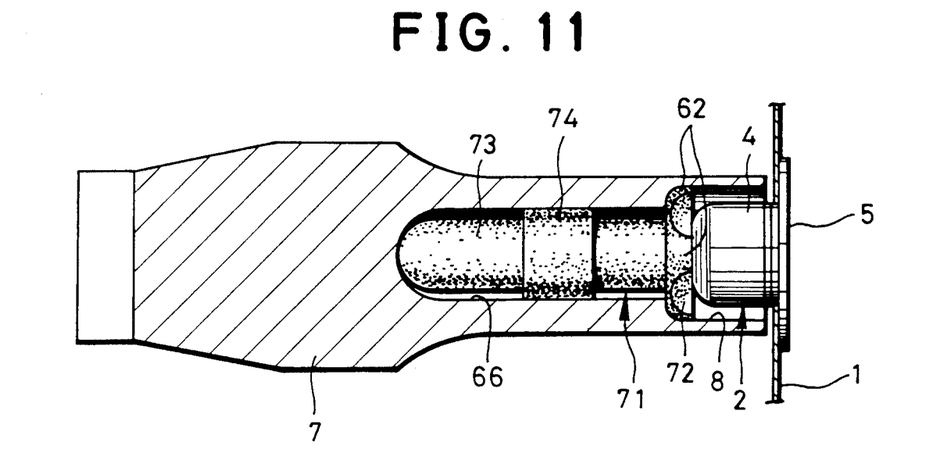
FIG. 11 is a cross section showing another example of the ultrasonic vibration horn itself.
Figure 12:
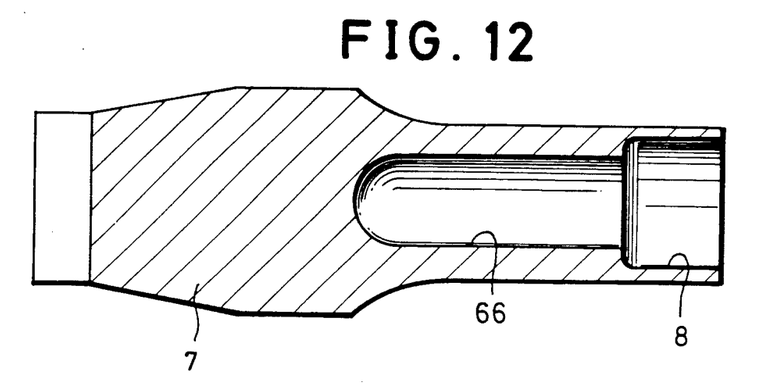
FIG. 12 is a cross section showing a further example of the ultrasonic vibration horn itself.
Figure 13:
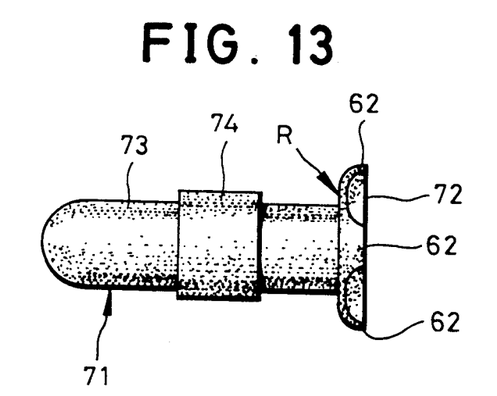
FIG. 13 is a side view of another example of the elastic member itself.

The structure shown in FIG. 11 may be used instead of the structure shown in FIG. 8. In such structure, in addition to the recess 8, a mounting recess 66 having a circular cross section and communicated with the recess is formed in the vibration horn 7 as shown in FIG. 12. On the other hand, the elastic member 71 is composed of a spout pressing portion 72 for preventing undesired vibration of the spout by contacting with the cap 4 under a suitable pressure and a support portion 73 formed integrally with the spout pressing portion 72, as shown in FIG. 13.

Figure 14:
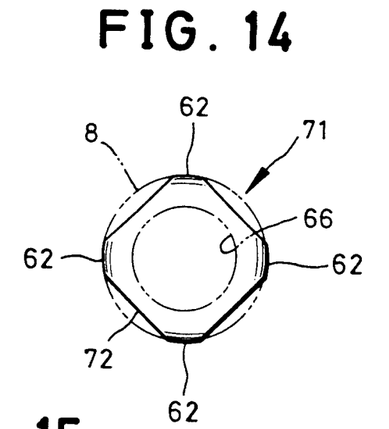
FIG. 14 is a front view of the elastic member shown in FIG. 13.

The spout pressing portion 72 has corner portions 62 which are partially contact with an inner surface of the recess 8 of the vibration horn 7. As shown in FIG. 14, the spout pressing portion 72 having such corner portions 62 has a substantial square cross section as in the resilient member 61 in FIG. 10 and is adapted to be in contact with the inner surface of the recess 8 with the four corners 62 and a rear surface R. That is, the both are partially in contact with each other. The corner portions 62 are rounded concomitantly with the inner surface configuration of the recess 8.

The support portion 73 is, generally, in the shape of a cylinder having diameter smaller than that of a mounting recess 66 provided in the vibration horn 7. The cylinder has an enlarged diameter portion 74 in a middle portion thereof whose diameter is selected such that it partially contacts with an inner surface of the mounting recess 66.

In performing a fusing of the spout 2 by means of the vibration horn 7, the top end of the horn 7 is abutted to the spout flange 5 through the package 1 such that a protruded portion of the vibration horn 7, that is, the pouring portion 4 of the spout 2 is surrounded by the top end portion of the horn 7. At this time, the resilient member 61 (FIG. 8) or the spout pressing portion 72 (FIG. 11) presses the pouring portion 4 with a suitable pressure, so that vibration of the spout 2 is prevented. In this case, although an amount of deformation of the resilient member 61 or the spout pressing portion 72 depends upon the configuration of the inner surface of the horn recess 8, it is preferable to select the amount of deformation in usual case such that it is depressed down by 2 to 3 mm during the spout fusing operation.

The resilient member 61 (FIG. 8) is partially in contact with the horn recess 8 at the corner portions 62 and the rear periphery R. The resilient member 71 (FIG. 11) has the spout pressing portion 72 in contact with the horn recess 8 at the corner portions 62 and the rear periphery R and the support portion 73 in contact with the mounting recess 66 at the enlarged diameter portion 74. That is, either of the resilient member 61 or the spout pressing portion 72 partially contacts with the recess 8 or 66 of the vibration horn 7. Therefore, a contact area between the resilient member 61 or the spout pressing portion 71 with the horn 7 becomes very small, resulting in frictional heat generation minimized. Thus, the vibration horn 7 is hardly heated excessively even if it is used for a long time and thus an abnormal large load on the converter 50 and the booster 51 (FIG. 4) for actuating the vibration horn 7 is avoided. Consequently, it becomes possible to perform the spout fusing operation reliably for a long time.

For the resilient member 71 shown in FIG. 11, the support portion 73 is hardly broken by pressing force applied thereto during the fusing operation due to the contact of the enlarged portion 74 thereof with the mounting recess 66, thus it is possible to press the spout 2 reliably.

Figure 15:
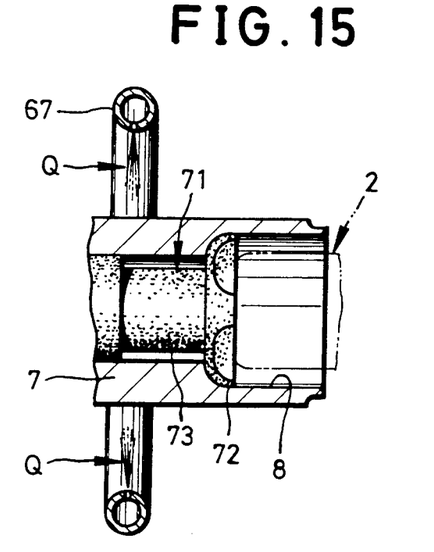
FIG. 15 is a cross section showing a modification of the ultrasonic vibration horn.

As shown in FIG. 15, it is possible to provide a cooling blow pipe 67 around the top portion of the vibration horn 7 to blow coolant air Q from the pipe 67 to the vibration horn 7. With this cooling system, temperature increase of the vibration horn 7 due to frictional heat can be further restricted. In this case, a small amount of coolant air to be supplied from the blow pipe 67 to the vibration horn 7 may be enough to obtain the expected effect since, in the present apparatus, the resilient member 61 or the spout pressing portion 71 is partially in contact with the horn recess 8 or 66 to minimize heat generation of the vibration horn 7.

Cleaning Device 23

Figures 16, 17:
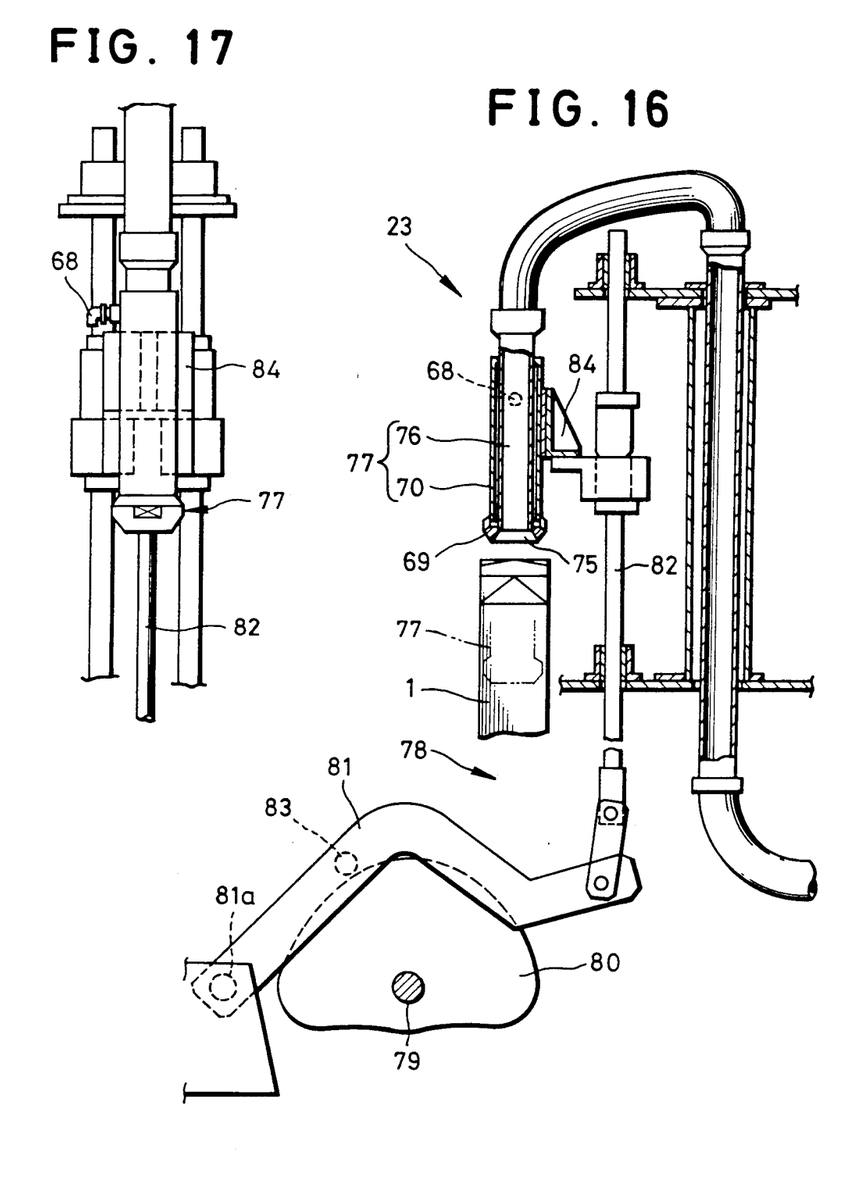
FIG. 16 is a partly cross sectional elevational view showing an example of a cleaning device which is one of the devices constituting the filling and sealing apparatus shown in FIG. 1.
FIG. 17 is a front view of the cleaning device.

The cleaning device 23 arranged subsequent to the spout fusing device 22 includes a coaxial cleaning pipe 77 composed of an outer blow pipe 70 having an annular air jet nozzle 69 for jetting air supplied through an air intake hole 68 and an inner suction pipe 76 having a suction hole 75 for removing foreign materials, as shown in FIGS. 16 and 17. The blow pipe 70 and the suction pipe 76 are connected to an air pressure source and a vacuum source through suitable control valves, respectively.

The cleaning device 23 further includes cleaning pipe elevation means 78 for lowering the cleaning pipe 77 down through the upper opening A (FIG. 18) into the package 1 when the package 1 comes up to a position immediately beneath the cleaning device 23. The elevation means 78 includes a drive shaft 79 coupled to the drive source of the package conveyor belt 30, a cam 80 rotatably driven by the drive shaft 79, a cam lever 81 swingable around a support shaft 81a by the cam 80 and a rod 82 vertically driven by the cam lever 81. A roller 83 is mounted rotatably on the cam lever 81 and in contact with an outer periphery of the cam 80. The roller 83 is deviated in position with rotation of the cam 80 to swing the cam lever 81 about the support shaft 81a.

Since the elevation means 78 is driven by the same drive source as that of the package conveyor belt 30, the overall structure of the filling and sealing apparatus becomes simpler and its control becomes easier compared with the conventional apparatus.

The cleaning pipe 77 is supported by a bracket 84 fixedly secured to the rod 82 constituting the elevation means 78 and vertically driven by the vertical movement of the rod 82, within a range which can be regulated by changing the position of the bracket 84.

When the coaxial cleaning pipe 77 is lowered by the elevation means 78, air is jetted through the air jet nozzle 69 formed at the lower end of the blow pipe 70 to an inner wall surface of the package 1. Dust such as paper particles is blown up by this air jet is immediately sucked up and discharged by the suction pipe 76 through the suction hole 75 thereof. Upon completion of the cleaning operation, air jetting and dust sucking operations are stopped and the cleaning pipe 77 is lifted up by the elevation means 78.

Thus, factors such as bad smell which may affect the quality of the content of the container 1 can be efficiently removed.

The air jetting and dust sucking operations may be performed not only during a lowering stroke of the cleaning pipe 77 but also during an elevation stroke thereof. Further, these operations may be performed twice during lowering and elevation strokes.

The cleaning unit 23 may be arranged in between the first top breaker device 24 and the filling device 25 shown in FIG. 1. However, when it is arranged subsequent to the first top breaker device 24, it may become difficult to clean the package wall portions which are hidden by folded portions of the package. Further, there may be a case where the upper portion of the package is damaged during the lowering stroke of the cleaning pipe 77. Therefore, the location of the cleaning unit 23 is preferably in an upstream of the first top breaker device 24.

The present apparatus has been described with reference to the embodiment in which the mandrels 16 in the package shaping and supplying portion 14 are rotated intermittently around the horizontal axis, that is, in a vertical plane, as shown in FIG. 2 and the package conveyor belt 30 in the packaging portion 13 conveys the packages linearly as shown in FIG. 1. However, the present invention can be applied to filling and sealing apparatus of other types. For example, the present invention is applicable to a filling and sealing apparatus of turn table type as shown in FIG. 25.

In the apparatus shown in FIG. 25, a package proper supplying and shaping portion 14 is arranged below a packaging portion 13 and mandrels 16 in the package proper supplying and shaping portion 14 are rotated intermittently around a vertical axis, that is, in a horizontal plane. On the other hand, a turn table 85 on which plurality of, for example, eight package receiving plates 86 are mounted and a guide rail 87 arranged around the turn table 85 are provided in the packaging portion 13. The turn table 85 is driven by the same drive source as that of the mandrels 16. Around the turn table 85, a spout temporary mounting device, a spout fusing device and a cleaning device, etc., which constitutes the packaging portion 13 and may have the same structures as those shown in FIG. 1, respectively, are arranged with suitable intervals. Since an operation of this embodiment is substantially the same as that of the previous embodiment except the conveying path configulation, details thereof are omitted.

Figure 25:
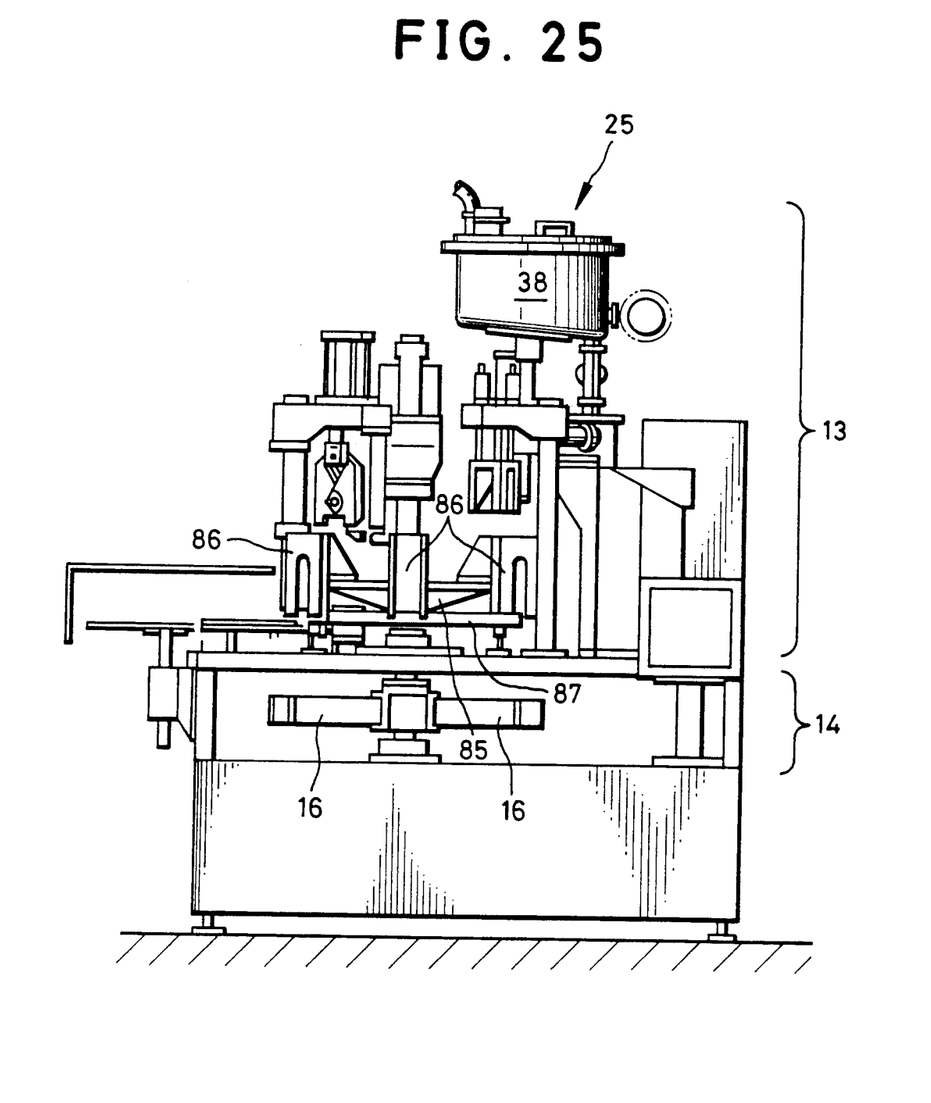
FIG. 25 is a front view of another embodiment of the filling and sealing apparatus according to the present invention.

Also in the embodiment shown in FIG. 25, package proper 1b (FIG. 24) are fitted on the mandrels 16 in the package proper supplying and shaping portion 14 and bottoms of these packages are formed during intermittent rotation of the mandrels 16 to form the package 1 as shown in FIG. 18. The packages 1 thus formed are removed from the mandrels 16 and put on the package receiving plates 86 of the turn table 85 manually. The packages 1 mounted on the package receiving plates 86 are carried intermittently on the turn table 85 with intermittent rotation thereof guided by the guide rail 87 and subjected to the same operations as the spout temporary mounting and spout fusing operations, etc., to be performed in the packaging portion 13 shown in FIG. 1.

Thus, the present invention can be applied to the filling and sealing apparatus of the turn table type.

Although the present invention has been described with respect to the preferred embodiments, various modifications of the present, invention can be done within the scope of the appended claims.

What is claimed is:

1. A filling and sealing apparatus for a fluid containing package, comprising:

spout attaching means for temporarily attaching a spout having a flange onto an inside of a wall of said package, said package having one end open and the other end closed;

spout fusing means for fusing said flange to said inside of said package after said spout is temporarily attached to said inside of said package, said spout fusing means comprising an anvil around which said package having said temporarily attached spout is adapted to be fitted;

filling means for filling said package with a fluid through said open end;

package sealing means for sealing said open end after said package is filled with said fluid;

ultrasonic fusing means arranged in facing relation to said anvil for pressing said flange or said temporarily attached spout against said anvil; and temperature regulation means for regulating a temperature of said anvil by supplying a temperature regulation fluid through said anvil;

wherein said spout can be fixedly fused to said inside of said package by said ultrasonic fusing means while regulating said temperature of said anvil by said temperature regulation means.

2. A filling and sealing apparatus according to claim 1, wherein said temperature regulation means comprises a cavity formed in said anvil, a fluid supply pipe inserted into said cavity and a fluid discharge pipe inserted into said cavity.

3. A filling and sealing apparatus according to claim 1, wherein said temperature regulation means supplies a coolant liquid to said anvil.

4. A filling and sealing apparatus according to claim 1, wherein said temperature regulation means supplies a high temperature fluid to said anvil.

5. A filling and sealing apparatus for fluid containing package, comprising:

spout attaching means for temporarily attaching a spout having a flange onto an inside of a wall of said package, said package having one end open and the other end closed;

spout fusing means for fusing said flange to said inside of said package after said spout is temporarily attached to said inside of said package, said spout fusing means comprising an anvil around which said package having said temporarily attached spout is adapted to be fitted;

filling means for filling said package with a fluid through said open end;

package sealing means for sealing said open end after said package is filled with said fluid;

an ultrasonic vibration horn arranged in facing relation to said anvil, said ultrasonic vibration horn having a top end portion formed with a recess for receiving a pouring portion of said spout protruding outwardly from said package and being capable of vibrating at an ultrasonic frequency; and a resilient block member provided in said recess of said ultrasonic vibration horn, said resilient block member being partially in contact with an inner peripheral surface of said recess;

wherein said spout can be pressedly held by said resilient block member during the fusing operation of said flange to said package by said vibration horn.

6. A filling and sealing apparatus according to claim 5, wherein:

said resilient block member includes a spout pressing portion and a support portion formed integrally with said spout pressing portion;

said recess of said ultrasonic vibration horn includes a top recess for covering said spout and a mounting recess communicated with said top recess;

said spout pressing portion of said resilient block member is received in said top recess of said ultrasonic vibration horn and said support portion of said resilient block member is received in said mounting recess; and said spout pressing portion of said resilient block member partially contacts with said top recess of said ultrasonic vibration horn and said support portion of said resilient block member partially contacts with said mounting recess of said ultrasonic vibration horn.

7. A filling and sealing apparatus according to claim 5, further comprising a coolant blow pipe provided around said top end portion of said ultrasonic vibration horn for blowing coolant fluid to said vibration horn.

8. A filling and sealing apparatus for a fluid containing package, comprising:

spout attaching means for temporarily attached a spout having a flange onto an inside of a wall of said package, said package having one end open and the other end closed;

spout fusing means for fusing said flange to said inside of said package after said spout is temporarily attached to said inside of said package, said spout fusing means comprising an anvil around which said package having said temporarily attached spout is adapted to be fitted;

filling means for filling said package with a fluid through said open end;

package sealing means for sealing said open end of said package after said package is filled with said fluid; and an ultrasonic vibration horn arranged in facing relation to said anvil, said anvil being formed with a groove in a side surface thereof, said groove being adapted to be in contact with said temporarily attached spout, said groove extending along the direction of insertion of said package to said anvil so that said flange of said temporarily attached spout may be received by said groove, whereby said spout may not collide with the side surface of said anvil when said package is being fitted on said anvil.

* * * * *